United States Patent Office 3,562,312
Patented Feb. 9, 1971

3,562,312
MANUFACTURE OF 2-SUBSTITUTED RESORCINOL DERIVATIVES
Albert Eschenmoser, 9 Bergstrasse, Kusnacht, Switzerland, and Theodor Petrzilka, 6 Rigistrasse, Erlenbach, Switzerland
No Drawing. Filed Oct. 24, 1967, Ser. No. 677,720
Claims priority, application Switzerland, Nov. 4, 1966, 15,965/66
Int. Cl. C07c 39/10, 65/04, 69/88
U.S. Cl. 260—473                                      7 Claims

ABSTRACT OF THE DISCLOSURE

Preparation of 2-substituted resorcinol derivatives of the general formula

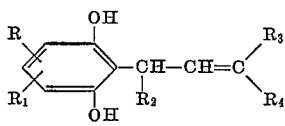

where R is hydrogen, carboxyl or carbalkoxy, $R_1$ is hydrogen or alkyl, $R_2$ is hydrogen or alkyl, and $R_3$ and $R_4$ each is hydrogen, alkyl, alkenyl or alkynyl or in which two of the groups $R_2$, $R_3$ and $R_4$ are linked together to form a 5- or 6-membered ring, by condensing a resorcinol of the general formula

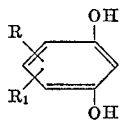

wherein R and $R_1$ have the same meanings given above, with an unsaturated allyl alcohol of the general formula

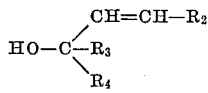

wherein $R_2$, $R_3$ and $R_4$ have the same meanings given above, in the presence of an N,N-dimethylformamide dialkyl acetal.

---

The present invention relates to the manufacture of 2-substituted resorcinol derivatives of the general formula

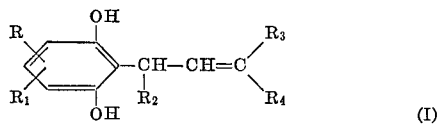

in which R represents hydrogen, carboxyl or carbalkoxy, $R_1$ represents hydrogen or alkyl, $R_2$ represents hydrogen or alkyl, and $R_3$ and $R_4$ each represent hydrogen, alkyl, alkenyl or alkynyl, or in which two of the residues $R_2$, $R_3$ and $R_4$ are linked together to form a 5- or 6-membered ring.

The process of the invention comprises condensing a resorcinol of the general formula

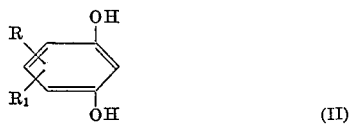

in which R and $R_1$ have the meanings given above, with an unsaturated alcohol of the general formula

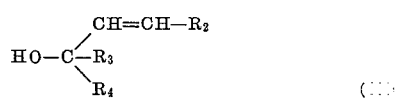

in which $R_2$, $R_3$ and $R_4$ have the meanings given above, in the presence of an N,N-dimethylformamide dialkyl acetal.

In addition to representing hydrogen or carboxyl, as stated above, R represents carbalkoxy, illustrative examples of which are carbethoxy, carbpropoxy and carbbutoxy.

In addition to representing hydrogen, the group $R_1$ preferably represents an alkyl group, particularly containing up to 10 carbon atoms (e.g. methyl, ethyl, n-propyl, isopropyl, n-butyl, isobutyl, n-amyl, isoamyl, n-hexyl, isohexyl, n-heptyl, isoheptyl, n-octyl, isooctlyl, n-nonyl, isononyl, n-decyl and isodecyl), and especially containing from 1 to 4 carbon atoms. Such alkyl groups are preferably situated in the 5-position of the resorcinol molecule. In addition to representing hydrogen, the group $R_2$ preferably represents a lower alkyl group having from 1–6 carbon atoms (e.g. methyl, ethyl or other lower alkyl groups such as those enumerated above). The groups $R_3$ and $R_4$ can, in addition to hydrogen, represent, for example, a saturated or unsaturated, branched or straight-chain hydrocarbon residue containing up to 20 carbon atoms, notably alkyl groups such as those enumerated above as well as the corresponding alkenyl and alkynyl groups as, for instance, ethenyl, propenyl, isopropenyl, butenyl, isobutenyl, ethynyl, propynyl, butynyl, etc.

As examples of suitable starting materials of Formula II, there can be mentioned resorcinol, olivetol, olivetol carboxylic acid (and esters thereof) and 5-methylresorcinol. Examples of suitable allyl alcohols of Formula III for use in the process of the invention include geraniol, and, above all, tertiary alcohols such as, for example, linalool, isophytol, nerolidol, methylbutenol and (+)-trans- and (+)-cis-p-menthadien-(2,8)-ol-(1).

The reaction of the compound of Formula II with the compound of Formula III is conveniently effected in an inert solvent such as a halogenated hydrocarbon, for example methylene chloride, an aliphatic or alicyclic ether, for example diethyl ether or dioxan, or tetrahydrofuran. The reaction is carried out in the presence of a dialkyl acetal of N,N-dimethylformamide, advantageously one in which the alkyl residues are branched. Especially preferred is N,N-dimethylformamide dineopentyl acetal. The condensation reaction is advantageously effected at a temperature of from 0° up to the boiling temperature of the solvent, preferably at approximately room temperature.

By the process of the invention it is possible to prepare 2-substituted resorcinols in a simple manner and under mild conditions. Accordingly, a rational route to these resorcinol derivatives with bactericidal action is opened. By way of illustration, they exhibit bactericidal action against such bacteria as *Staphylococcus aureus* and *Histoplasma capsulatum*, being effective, for instance, by contacting such bacteria or products or compositions containing or infected by said bacteria with aqueous solutions or emulsions containing from about 0.001% to about 0.1% of said resorcinol derivatives. If desired, the compounds of Formula I can be cyclised in a manner known per se (e.g. by treatment with an acidic agent) to a benzopyran or benzofuran derivative. Among the benzopyran derivatives obtainable in this manner, there are pharmacologically active substances of the tetrahydrocannabinol type, which is ingredient of hashish, and which are useful for the same or similar purposes in substantially the same manner as hashish and similar substances.

The following examples are illustrative of the practice of the invention but are not to be construed in any way as limitative of the invention since many changes can be made without departing from the guiding principles and teaching disclosed herein. All reference to temperatures is in terms of degrees centigrade.

EXAMPLE 1

1 g. of resorcinol (9.09 mol) and 1.63 ml. of linalool (9.09 mol) are dissolved in 12 ml. of anhydrous ether. 2.3 g. of N,N-dimethylformamide dineopentyl acetal are subsequently added, whereby there separates out a white precipitate which remains substantially undissolved during the course of the reaction. The mixture is reacted by maintaining the same for 41 hours at 20° under a nitrogen atmosphere with magnetic stirring. The initially yellow coloured reaction mixture turns brown-red during the course of the reaction. The insoluble precipitate is thereafter filtered off (180 mg.). On the addition of ether, a further 242 mg. of the same precipitate separate out. The filtered ether solution is then shaken with 1 N caustic soda and the alkaline extract is subsequently acidified and taken up in benzene. There separates out a solid precipitate (142 mg.) which is identified as resorcinol. The benzene solution is evaporated and the remainder of the resorcinol is sublimed off on a water-bath at ca. 80°/0.001 torr. There remain 162 mg. of 2-[3,7-dimethyloctadien-(2,6)-yl-(1)]-resorcinol which distills at 100–110°/0.001 torr.

*Analysis.*—Calculated (percent): C, 78.01; H, 9.00. Found (percent): C, 77.97; H, 8.90.

UV-absorption maximum in rectified spirit at 281 mμ ($\epsilon=2960$).

EXAMPLE 2

940 mg. of olivetol (5.23 mmol) and 875 mg. of (+)-trans-p-menthadien-(2,8)-ol-(1) (5.75 mmol) are dissolved in 15 ml. of absolute methylene chloride (dried over calcium chloride) and added to 1537 mg. of N,N-dimethylformamide dineopentylacetal (6.8 mmol) under an atmosphere of nitrogen. The mixture is stirred at 20° with a magnetic stirrer for 45 hours. The reaction solution is thereafter taken up in ether and shaken five times with water. The emulsion which is obtained at first is eliminated by means of a small amount of saturated sodium chloride solution. The ether extract is dried over sodium sulphate and evaporated (1.834 g.). This product is then distilled in a bulb tube at 0.02 torr to give the following fractions:

| | | | |
|---|---|---|---|
| 1st fraction | 100–110° | Colourless | (¹). |
| 2nd fraction | 160–180° | Yellow-oily | 545 mg. |
| 3rd fraction | 200–210° | Dark yellow-oily | 772 mg. |
| 4th fraction | 210–250° | Brown | 161 mg. |
| 5th fraction | Residue | Resinified | 30 mg. |

¹ Starting alcohol, for the most part distilled off.

By chromatography of fractions 2–4 on silica gel using benzene, unreacted olivetol and cis-cannabidiol are separated from transcannabidiol and a product A obtained. The trans-cannabidiol is subsequently separated from the product A on Florisil using hexane. The approximate yields are as follows:

| | Mg. | Percent |
|---|---|---|
| Cis-cannabidiol | 330 | 21 |
| Trans-cannabidiol | 350 | 22 |
| Product A | 80 | 5 |
| Recovered olivetol | 396 | 24 |

The chromatographed pure fraction of trans-cannabidiol is distilled at 165–180°/0.001 torr. This product agrees in all properties, inclusive of optical rotation, with the spectral data given for natural cannabidiol. The chromatographed pure fraction of cis-cannabidiol is distilled at 175–180°/0.02 torr.

*Analysis.*—Calculated (percent): C, 80.21; H, 9.62. Found (percent): C, 80.45; H, 9.69.

UV-absorption maxima in rectified spirit at 220 and 286 mμ ($\epsilon=8350$ and 2000).

For confirmation of identification, 91 mg. of trans-cannabidiol are dissolved in 1.5 ml. of pyridine and treated with 145 mg. of 3,5-dinitrobenzoyl chloride. The mixture is allowed to stand at 20° for 15 hours and finally briefly heated to 50°. The mixture is then taken up in ether, shaken with 1 N ice-cooled hydrochloric acid and rinsed twice with water. After drying over sodium sulphate and evaporation there remain 194 mg. of solid residue. On the addition of ca. 4 ml. of benzene, there separate out 6 mg. of crystals having a melting point which agrees with that of the dinitrobenzoic acid anhydride. After chromatography of the remaining 188 mg. of the residue, there are obtained as the main fraction 120 mg. of a colourless oil which is crystallized from methyl acetate/methanol. After recrystallization once from methyl acetate/methanol, there is obtained the bis-dinitrobenzoate of trans-cannabidiol of melting point 105–106°, which substantially agrees with the literature melting point of 106–107½°. A mixed sample of the dinitrobenzoate obtained with an authentic preparation shows no depression of the melting point.

EXAMPLE 3

1.660 g. (9.2 mmol) of olivetol are reacted under nitrogen with 1.535 g. (10.1 mmol) of (+)-trans-p-menthadien-(2,8)-ol-(1) in the presence of 2.78 g. (12 mmol) of N,N-di-methylformamide dineopentyl acetal in 20 ml. of dry methylene chloride and with stirring for 3 days. The residual reaction solution (the methylene chloride is in part evaporated) is taken up in 70 ml. of ether and shaken five times with water. The emulsions which form at first are separated by the addition of a small amount of saturated sodium chloride solution. The aqueous phases colour fluorescent green. The ether extract is dried and evaporated at room temperature to give 3.7 g. of a brown-yellow oil. This oil is separated on 100 g. of silica gel using benzene, chloroform and chloroform/methanol (5:1) as eluants. The first separation gives the following results:

1st fraction.—Extraction with benzene gives 312 mg. of product A (molecular weight 448, disubstituted olivetol)

2nd fraction.—Extraction with benzene solution of product A gives trans- and cis-cannabidiol, trans-p-menthadienol 3rd fraction.—Extraction with chloroform gives 1055 mg. of cis-cannabidiol (impure)

4th fraction.—Extraction with chloroform gives 117 mg. of cis-cannabidiol and olivetol 5th fraction. — Extraction with chloroform/methanol (5:1) gives 810 mg. of olivetol (impure)

6th fraction.—Extraction with chloroform/methanol (5:1) gives 70 mg. of olivetol.

After repeated chromatography of fractions 2–5 and subsequent distillation there are obtained:

135 mg. of (+)-trans-p-menthadien-(2,8)-ol-(1)
265 mg. of product A
530 mg. of trans-cannabidiol (yield 31.4%)
890 mg. of cis-cannabidiol (yield 52.4%) and
690 mg. of olivetol

EXAMPLE 4

1.0 g. (3.96 mmol) of 6-carbethoxy olivetol and 662 mg. (4.36 mmol) of (+)-cis-p-menthadien-(2,8)-ol-(1) (which contains as impurities 1.91% of hydrocarbon, 9.6% (+)-trans-p-menthadien-(2,8)-ol-(1) and 2% of a secondary high boiling point alcohol with $[\alpha]_D^{20}=178°$), are dissolved in 10 ml. of methylene chloride and added to 1190 mg. (5.16 mmol) of N,N-dimethylformamide dineopentyl acetal under a nitrogen atmosphere. The mixture is stirred for 72 hours with a magnetic stirrer. The reaction solution is thereafter taken up in ether and shaken five times with water. Following a similar working up procedure to that described in the preceding examples, 1.650 g. of crude product was obtained. After repeated chromatography on silica gel and Florisil using benzene the following products are isolated:

(a) Cannabidiol-carboxylic acid ethyl ester, 346 mg. (23%), $[\alpha]_D^{20}=-87°$;

(b) Substance A, 169 mg.;
(c) Substance B, 94 mg.; and
(d) Recovered olivetol-carboxylic acid ethyl ester, 360 mg. (36%).

Analysis of cannabidiol-carboxylic acid ethyl ester.—Calculated (percent): C, 74.57; H, 8.87. Found (percent): C, 74.42; H, 8.90.

EXAMPLE 5

1.0 g. (3.96 mmol) of 6-carbethoxy-olivetol and 662 mg. (4.36 mmol) (+)-trans-p-menthadien-(2,8)-ol-(1) [which contains as impurities 3% (+)-trans-p-menthadien-(1,7) or -(1,8)-ol-(2) and 7% (+)-cis-p-menthadien-(2,8)-ol-(1)] are dissolved in 10 ml. of methylene chloride and allowed to react for 71 hours under nitrogen and with magnetic stirring in the presence of 1190 mg. (5.16 mmol) of N,N - dimethylformamide dineopentyl acetal. The reaction mixture is thereafter taken up in ether and shaken five times with water. Conventional working-up at 20° gives 1.640 g. of crude product, which is repeatedly chromatographed on silica gel and Florisil using benzene. In this way the following products are isolated:

(a) Cannabidiol-carboxylic acid ethyl ester, 639 mg. (42%);
(b) Substance A, 252 mg.;
(c) Substance B, 95 mg.; and
(d) Recovered olivetol-carboxylic acid ethyl ester, 334 mg. (33%).

92 mg. (0.238 mmol) (−)-cannabidiol-carboxylic acid ethyl ester is dissolved in 10 ml. of methanol and 15 ml. of 5% aqueous sodium hydroxide and boiled under reflux for one hour. Thereafter the reaction mixture is taken up in ether, and then shaken once with water and a little dilute hydrochloric acid and once with water. The ether extract is dried over sodium sulphate and evaporated. The product obtained is once more dissolved in 10 ml. of methanol and 15 ml. of 5% aqueous sodium hydroxide and heated under reflux for more than two hours on a water bath in order to effect complete saponification. Working-up following the procedures described hereinabove gives 48 mg. of a product possessing a standard paper chromatogram. The solution is filtered through silica gel and distilled under high vacuum at 180–190°/0.001 mm. Hg. The resulting product is subjected to a standard thin-layer chromatography and its $R_f$-value corresponds with that of (−)-cannabidiol. Similarly, the NMR-spectra and the IR-spectra are identical with those of (−)-cannabidiol.

We claim:

1. Process for the manufacture of 2-substituted resorcinol derivatives of the general formula

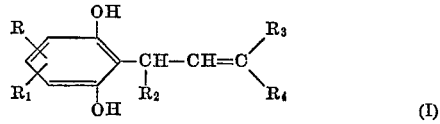

(I)

wherein R represents hydrogen, carboxyl or carbalkoxy, $R_1$ represents hydrogen or alkyl, $R_2$ represents hydrogen or alkyl and $R_3$ and $R_4$ each represent hydrogen, alkyl, alkenyl or alkynyl or in which two of the groups, $R_2$, $R_3$ and $R_4$ are linked together to form a 5- or 6-membered ring, which comprises condensing a resorcinol of the general formula

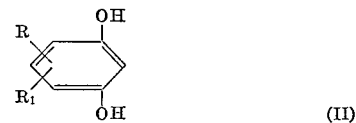

(II)

in which R and $R_1$ have the meanings given above, with an unsaturated allyl alcohol of the general formula

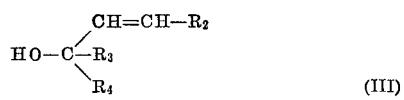

(III)

in which $R_2$, $R_3$ and $R_4$ have the meanings given above, in the presence of an N,N-dimethylformamide dialkyl acetal.

2. Process according to claim 1, wherein the alkyl group of $R_1$ contains from 1 to 10 carbon atoms, and where the hydrocarbon residue of each of $R_3$ and $R_4$ contains up to 20 carbon atoms and is seletced from the class of alkyl, alkenyl and alkynyl groups.

3. Process according to claim 2, wherein the reaction is carried out in the presence of N,N-dimethylformamide dineopentyl acetal.

4. Process according to claim 2, wherein resorcinol is reacted with linalool.

5. Process according to claim 2, wherein olivetol is reacted with (+)-trans-p-menthadien-(2,8)-ol-(1).

6. Process according to claim 2, wherein 6-carbethoxy-olivetol is reacted with (+) - cis - p - menthadien-(2,8)-ol-(1).

7. Process according to claim 2, wherein 6-carbethoxy-olivetol is reacted with (+) - trans-p-menthadien-(2,8)-ol-(1).

References Cited

UNITED STATES PATENTS 2,915,563   12/1959   Fischer _____ 260—624

JAMES A. PATTEN, Primary Examiner

R. S. WEISSBERG, Assistant Examiner

U.S. Cl. X.R.

260—345.3, 346.2, 521, 625, 999